(12) United States Patent
Bryant et al.

(10) Patent No.: US 8,659,991 B2
(45) Date of Patent: *Feb. 25, 2014

(54) MINIMIZING THE NUMBER OF NOT-VIA ADDRESSES

(75) Inventors: Stewart Frederick Bryant, Reading (GB); Ian Michael Charles Shand, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 425 days.

This patent is subject to a terminal disclaimer.

(21) Appl. No.: 12/965,038

(22) Filed: Dec. 10, 2010

(65) Prior Publication Data

US 2012/0147736 A1    Jun. 14, 2012

(51) Int. Cl.
*H04L 12/28* (2006.01)
(52) U.S. Cl.
USPC .......................................... 370/216; 370/400
(58) Field of Classification Search
USPC ......... 370/216–221, 242, 247, 248, 252, 253, 370/351, 352, 400, 256, 389, 392, 396, 397, 370/398
See application file for complete search history.

(56) References Cited

U.S. PATENT DOCUMENTS

| | | | |
|---|---|---|---|
| 6,148,410 A | | 11/2000 | Baskey et al. |
| 7,508,755 B2 * | | 3/2009 | Liu ............................... 370/228 |
| 7,697,416 B2 * | | 4/2010 | Shand et al. ................... 370/216 |
| 7,848,224 B2 * | | 12/2010 | Bryant et al. .................. 370/216 |
| 7,885,179 B1 * | | 2/2011 | Bryant et al. .................. 370/216 |
| 7,940,776 B2 * | | 5/2011 | Retana et al. ............. 370/395.31 |
| 2006/0187819 A1 | | 8/2006 | Bryant |
| 2010/0172237 A1 | | 7/2010 | Savage |

OTHER PUBLICATIONS

European Patent Office, Office Action for foreign patent application No. 06720965.0-1525, Applicant: Cisco Systems Inc., dated May 2, 2011, 5 pages.
Current claims in foreign patent application No. 06720965.0-1525, Applicant: Cisco Systems Inc., dated May 2011, 3 pages.
International Search Report received in PCT Application No. PCT/US2011/063912 dated Feb. 28, 2012 (5 pages).
Written Opinion of ISA received in PCT Application No. PCT/US2011/063912 dated Feb. 28, 2012 (8 pages).
Current Claims, PCT Application No. PCT/US2011/063912 (4 pages).
Shand S. Bryant, Previdi Cisco Systems entitled, "IP Fast Reroute Using Not-Via Addresses" dated Oct. 21, 2010.
European Patent Office, "Office Action" in application No. 06 720 965.0-1505, dated Apr. 25, 2013, 6 pages.
Current Claims in application No. 06 720 965.0-1505, dated Apr. 2013, 5 pages.

* cited by examiner

*Primary Examiner* — Hanh N Nguyen
(74) *Attorney, Agent, or Firm* — Hickman Palermo Truong Becker Bingham Wong LLP

(57) ABSTRACT

In an embodiment, a method comprises determining a set of protected components that are associated with a notifying node; determining a single network repair address for the set of protected components, wherein the single network repair address is for use in response to unavailability of any of the protected components when transmitting network traffic to the notifying node; assigning the single network repair address to each of the protected components; wherein the notifying node is an internetworking device and wherein the method is performed by one or more processors.

15 Claims, 6 Drawing Sheets

| Not-Via Repair Address 410 | Set of Operational Components 430 |
|---|---|
| S A&C | {A-S, C-S} |
| S B&D | {B-S, D-S} |

Fig. 4

MINIMIZING THE NUMBER OF NOT-VIA ADDRESSES

CROSS-REFERENCE TO RELATED APPLICATIONS

The subject matter herein generally relates to the subject matter of prior U.S. patent application Ser. No. 11/064,275, filed Feb. 22, 2005, and U.S. patent application Ser. No. 11/188,221, filed on Jul. 22, 2005.

TECHNICAL FIELD

The present disclosure is generally related to routing data communications between infrastructure elements of a network and relates more specifically to constructing a repair path around a protected component in a data communications network.

BACKGROUND

Data between a source node and a destination node in communications networks may be routed according to various routing protocols. One class of routing protocols is the link state protocol. In link state protocols, each node advertises information about its adjacent links and connectivity with other nodes. A link advertisement may be sent in a link state packet ("LSP"). Based on the advertised information included in the LSP, each node constructs a link state database ("LSDB") that contains a map of the entire network topology. From the data stored in a LSDB, a node constructs a routing information base ("RIB") that contains one or more routes to each available node in the network. The single optimum route to a node may be computed according to any of various algorithms, such as a shortest path first ("SPF") algorithm. Based on the information stored in a RIB, a node constructs a forwarding information base ("FIB") and uses the FIB to forward data packets to other nodes.

In a conventional link state protocol network, upon detecting that a network topology has changed, the nodes generate and disseminate new LSP advertisements that contain updated information about the nodes' connectivity. The LSP advertisements are received by other nodes and used by the nodes to update their routing databases.

However, generating, distributing and processing of the LSP advertisements, as well as updating a link state database, a routing information base and a forwarding information base at each node of the network are often time consuming and computationally complicated. Therefore, each time a network component fails, the network may be unstable for a relatively long period of time, during which the network tries to converge upon an agreed view of routing information in which nodes update their routing information.

Furthermore, as the network converges, routing databases may be temporarily de-synchronized and loops in data transmission may occur. For example, if a first node tries to send a data packet via a second node to a third node, but due to the network's de-synchronization, the second node determines that the best route to the third node is via the first node, then the second node sends the packet back to the first node, instead of forwarding the packet to the third node. This can continue until all nodes update their routing information, or unless some safety procedures are implemented, such as discarding the packet if a maximum hop count for the packet has been exceeded.

Bryant and Shand have proposed approaches in which each node generates a repair address for each of its protected neighbors in advance and advertises a particular repair addresses for a particular protected neighbor to other nodes. The particular repair address may be used by other nodes when the particular protected neighbor indeed fails. The repair address for the protected neighbor node is referred to as a not-via address. In one such approach, each node generates and advertises one not-via address for each of its protected neighbors, and each other node stores a not-via address for each of the protected components.

BRIEF DESCRIPTION OF THE DRAWINGS

In the drawings:

FIG. 4 illustrates an embodiment of a schematic representation of information carried in a not-via address advertisement;

DETAILED DESCRIPTION

Figure 1:
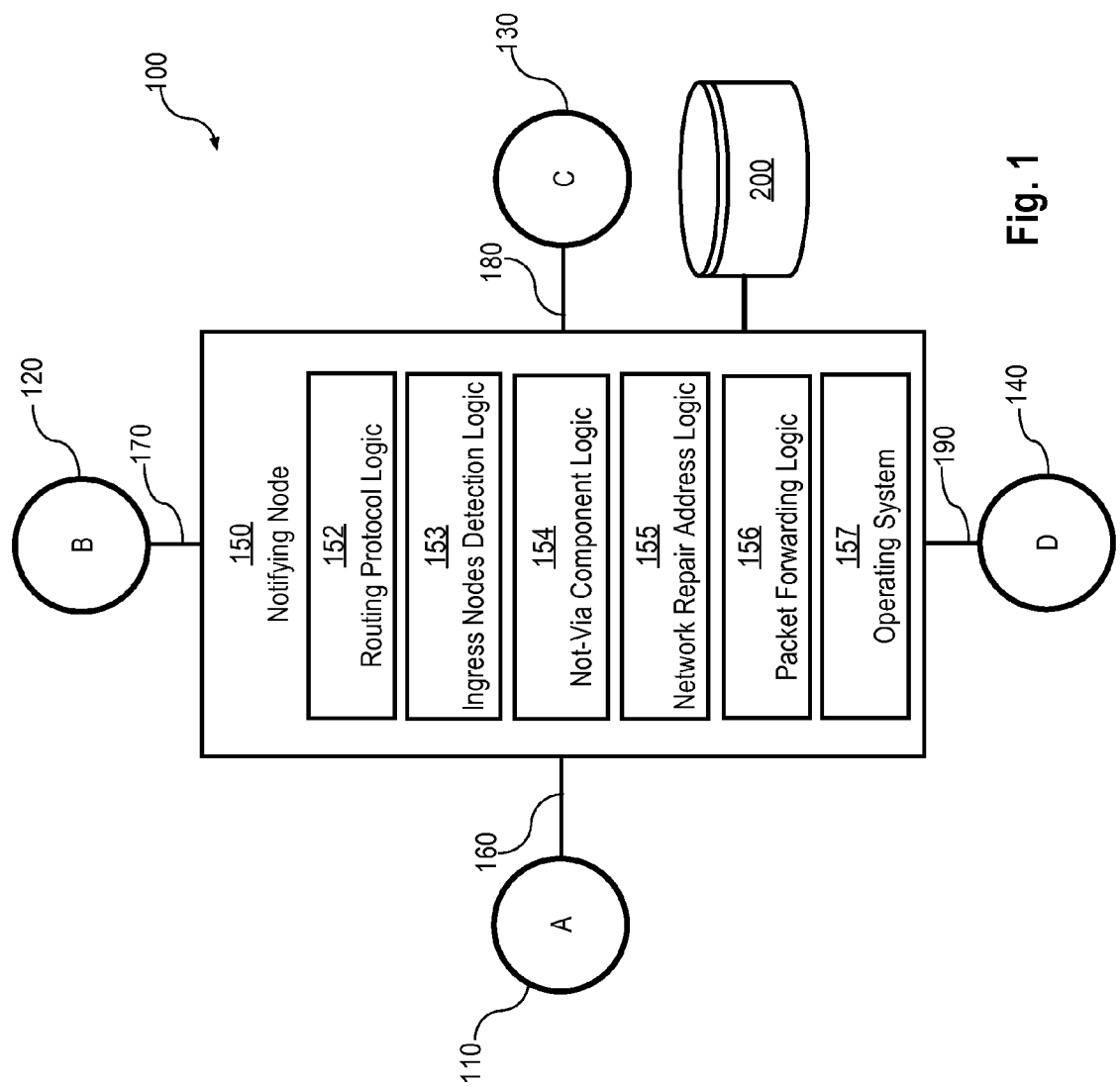
FIG. 1 illustrates an embodiment of a notifying node in a network.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Determining a Network Repair Address
4.0 Example of an Advertisement Comprising a Network Repair Address
5.0 Determining a Single Network Repair Address for a Set of Components
6.0 Using a Single Network Repair Address in an Event of Unavailability of a Component from a Set of Components
7.0 Implementation Mechanisms—Hardware Overview
8.0 Extensions and Alternatives
1.0 General Overview In an embodiment, a method comprises determining a set of protected components that are associated with a particular not-via component. For the particular not-via component, a single network repair address is determined. The single network repair address is for use in response to unavailability of any of the protected components when transmitting network traffic to the notifying node.

In an embodiment, a notifying node is an internetworking device.

In an embodiment, the method further comprises advertising a single network repair address and the set of protected components that is associated with the single network repair address.

In an embodiment, the set of protected components comprises one or more links that are adjacent to the notifying node. In an embodiment, the set of protected components comprises one or more nodes that are adjacent to the notifying node.

In an embodiment, determining a not-via component for a protected component comprises constructing a repair network topology that does not include the protected component and identifying a repair path around the protected component to the notifying node that does not include the protected component; the repair topology excludes network components that do not have a repair address capability.

In an embodiment, the method further comprises transmitting network traffic to the notifying node via the particular not-via component in response to detecting that a particular protected component, from the set of protected components, is unavailable, including encapsulating the network traffic using the network repair address.

In an embodiment, the network traffic is transmitted in a Multiprotocol Label Switching (MPLS) protocol network.

2.0 Structural and Functional Overview

In an embodiment, a method for minimizing the number of not-via addresses for protected components in a data communications network is provided. A protected component is a component for which a repair path is created and for which the repair path bypasses the protected component. A protected component may be a communications link or a node, such as a router, a switch, etc Minimizing the number of not-via addresses for the protected component is possible because often the computed repair paths computed for the protected component reach a notifying node via the same interface.

In an embodiment, the method provides for identifying a group of the protected components for which each of the normally computed repair paths reach a notifying node via the same interface. Instead of advertising the same repair path for each protected component in the group, a single not-via address may be advertised for the entire group of the protected components.

An embodiment optimizes finding not-via addresses for protected components in a network, minimizes the number of advertisements required to disseminate the not-via addresses and reduces a node's requirements for a storage space that a node needs to maintain for storing the primary routing information as well as backup routing information.

In an embodiment, a node that constructs repair paths for its adjacent components is referred to as a notifying node, and an adjacent component for which a repair path is found is referred to as a protected component.

In an embodiment, a notifying node identifies a set of components that are adjacent to the notifying node and through which the notifying node is reachable. A component may be a node adjacent to the notifying node or a link adjacent to the notifying node.

In an embodiment, for each of the adjacent components, a notifying node determines a not-via address that the notifying node may use if the adjacent component became unavailable. A not-via address for the adjacent component is computed as if the adjacent component has failed. For example, if the adjacent component that is adjacent to the notifying node is an adjacent link of the notifying node, then the notifying node will compute an alternate route that could carry the traffic to the notifying node around the adjacent link as if the adjacent link has failed.

The process can be repeated for each of the adjacent components of the notifying node and until each of the adjacent components has an associated alternate route. In an embodiment, upon determining a not-via address for each of the adjacent components, the notifying node associates each of the not-via address with the corresponding adjacent component for which the not-via address was found.

Some of the not-via address may be associated with more than just one adjacent component. For example, in a network, a notifying node may determine that the same not-via address may be determined for two or more links adjacent to a notifying node.

In an embodiment, determining a not-via address for a particular component comprises constructing a repair network topology that does not include the particular component and identifying a repair path around the particular component to the notifying node. Such a repair topology may exclude those network components that do not have a repair address capability, such as the nodes that have only one adjacent link.

In an embodiment, a notifying node determines not-via addresses for each of the components that are adjacent to the notifying node, and determines a set of protected components comprising the adjacent components that are associated with a particular not-via address. The particular not-via address is a single network repair address that can be used to transmit data traffic to the notifying node if any of the protected components in the set of the protected components becomes unavailable. The not-via address is a network repair address used when any of the protected components in the set of the protected components fails.

In an embodiment, a notifying node assigns a single network repair address (not-via address) to all of the protected components and advertises the single not-via address with the set of protected components. The not-via address advertisements are disseminated to other nodes in the network.

Upon receiving a not-via advertisement, a router stores the advertisement information in a database and generates forwarding tables for the not-via address provided in the advertisement. For example, if a router received a not-via address advertisement providing information about a not-via address associated with a set of protected components, then the not-via address may be used in the event of unavailability of any of the protected components in the set of protected components.

In an embodiment, a router stores a not-via address in association with the set of the protected components for which the not-via address was obtained. The router may also generate forwarding tables for the not-via address and use the not-via address to forward data packets to the not-via address if any of the components in the set of the protected components becomes unavailable.

In an embodiment, in response to detecting that a particular protected component, from the set of protected components became unavailable, network traffic, which otherwise would have been transmitted via the particular protected component, is transmitted to the notifying node via the particular not-via component using the associated not-via address.

The method is useful in networks configured with Multiprotocol Label Switching ("MPLS") protocol, but other protocols can be used.

FIG. 1 illustrates an embodiment of a notifying node in a network. In an embodiment, a data communications network 100 comprises one or more nodes A, B, C, D and a notifying node 150. Typically network 100 is a packet-switched data network and nodes comprise routers, switches, or other infrastructure elements; in some embodiments, the nodes may comprise computers or other endpoints. The node A 110 is communicatively coupled with the notifying node 150 via a communications link 160. The node B 120 is communicatively coupled with the notifying node 150 via a communications link 170. The node C 130 is communicatively coupled with the notifying node 150 via a communications link 180, and the node D 140 is communicatively coupled with the notifying node 150 via a communications link 190.

For simplicity and for purposes of illustrating clear examples, FIG. 1 shows one notifying node 150 and four other nodes. However, practical embodiments may use any number of nodes. Furthermore, the nodes may be connected with each other with more links than four links depicted in FIG. 1.

Notifying node 150 may be implemented in any type of computer. Examples include a router, switch, or general purpose computer. Node 150 may use hardware logic such as in an application-specific integrated circuit ("ASIC"), field-programmable gate array ("FPGA"), system-on-a-chip ("SoC") or other combinations of hardware, firmware and/or software.

In an embodiment, notifying node 150 comprises hardware and software modules configured to generate and maintain the node's forwarding information, and to process and transmit communications data packets to other nodes in a network. In an embodiment, the notifying node 150 may be implemented as a Multiprotocol Label Switching ("MPLS") communications node.

In an embodiment, notifying node 150 has an operating system module 157 and storage 200, which may comprise any number of modules of volatile or non-volatile memory, and may be used to store communications data or routing information. For example, storage 200 may store link state packets ("LSP"), a link state database ("LSDB") that contains a map of the entire network topology, a routing information base ("RIB") that contains a single optimum route to each available node and a forwarding information base ("FIB").

In an embodiment, the notifying node 150 also comprises Routing Protocol logic 152, ingress nodes detection logic 153, not-via component logic 154, network repair address logic 155 and packet forwarding logic 156. For purposes of this disclosure the term "logic" includes one or more computer programs or other software elements, hardware logic such as in an application-specific integrated circuit ("ASIC"), field-programmable gate array ("FPGA"), system-on-a-chip ("SoC") or other combinations of hardware, firmware and/or software.

In an embodiment, Routing Protocol Logic 152 is configured to generate and disseminate LSPs or other advertisements to other nodes, and to receive advertisements from other nodes. The advertisements contain information about connectivity and reachability of the nodes. Upon receiving an advertisement, the Routing Protocol Logic 152 stores the reachability information in a link state database ("LSDB") and uses the reachability information to determine routes to each node that may be reachable from the notifying node 150.

Routing Protocol Logic 152 may be also configured to execute a Shortest Path First ("SPF") algorithm, such as the Dijkstra algorithm, implemented in Intermediate System to Intermediate System ("IS-IS") and Open Shortest Path First ("OSPF") protocols. In an embodiment, Routing Protocol Logic 152 is configured to determine routes to the nodes that are reachable from the notifying node 150 by applying SPF to the reachability information stored in the node's LSDB. Route information for a particular reachable node is stored in a routing information base ("RIB"), which contains a single optimum route to each available node. Based on the information stored in the RIB, the Routing Protocol Logic 152 constructs a forwarding information base ("FIB") or forwarding table.

In an embodiment, ingress nodes detection logic 153 is configured to identify the nodes through which data traffic may be communicated to the notifying node 150. An ingress node may be any node that transmits data packets to the notifying node. The ingress points may be determined by running a reverse Shortest Path First (rSPF) algorithm with each link disabled in turn.

3.0 Determining a Network Repair Address

Figure 2:
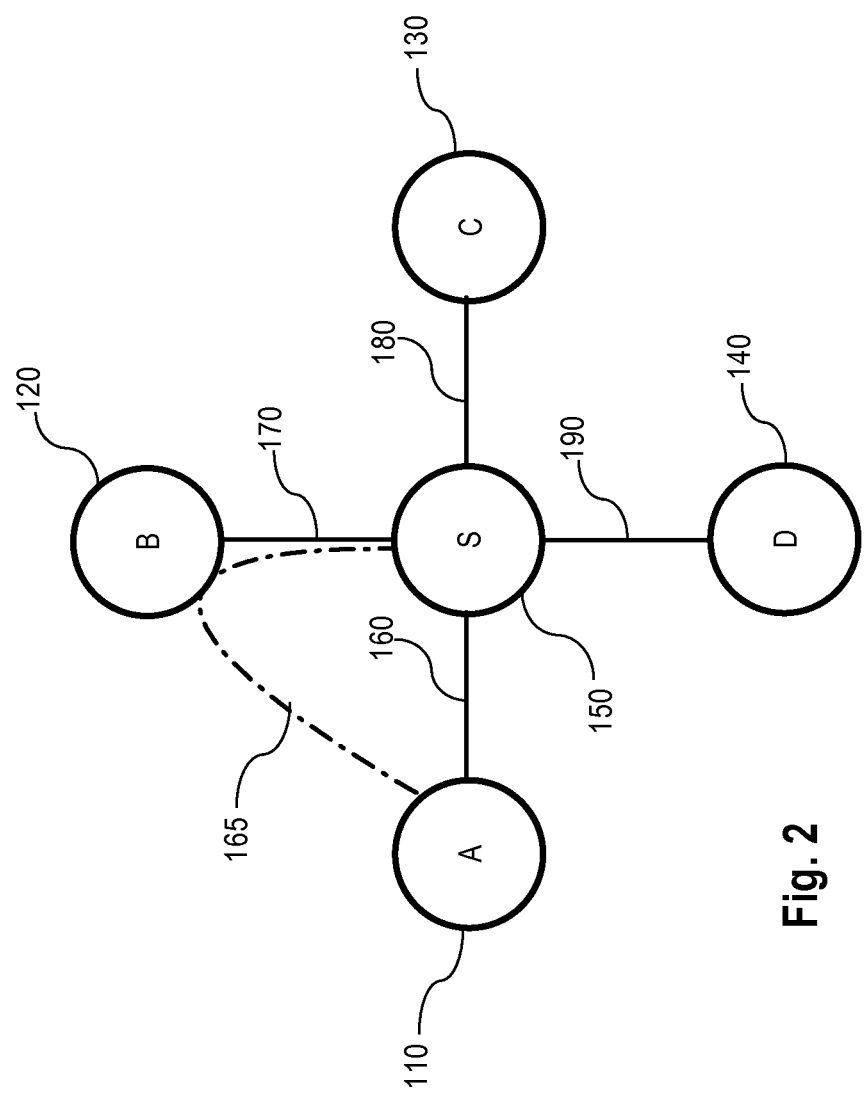
FIG. 2 illustrates an embodiment of determining a network repair address.
Figure 3:
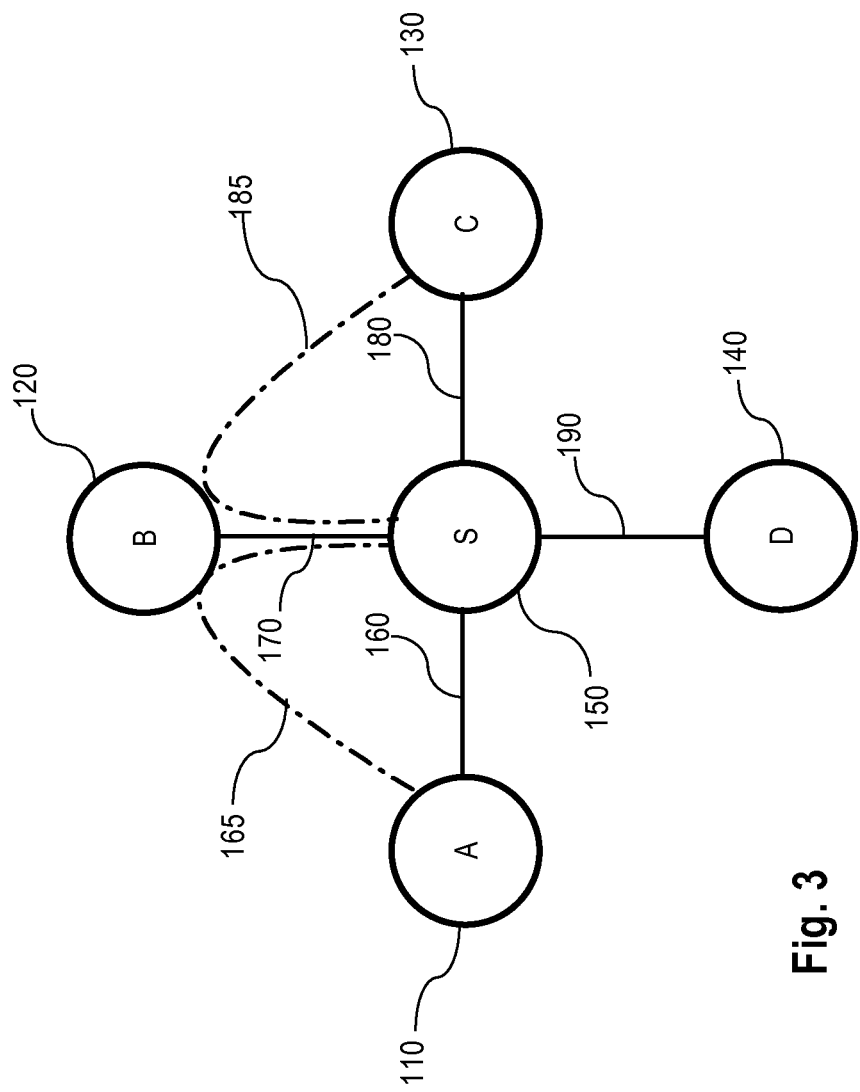
FIG. 3 illustrates an embodiment of determining a network repair address.

FIG. 2 and FIG. 3 illustrate embodiments of determining a network repair address. Referring first to FIG. 2, a notifying node 150 is depicted as node S. Node S is communicatively coupled with node A 110, node B 120, node C 130 and node D 140. The node A 110, B 120, C 130 and D 140 are communicatively coupled with the notifying node S 150 via a communications link 160, a communications link 170, a communications link 180, and a communications link 190, respectively.

For simplicity and for purposes of illustrating clear examples, FIG. 2 shows one notifying node S 150 and four other nodes. However, practical embodiments may use any number of nodes and links.

In an embodiment, nodes A 110, B 120, C 130 and D 140 are adjacent to the notifying node S 150. The nodes A 110, B 120, C 130 and D 140 are also ingress nodes for data traffic directed from other nodes to the notifying node S 150.

In an embodiment, an adjacent component may be any communications link that is directly adjacent to the notifying node S 150. For example, a set of adjacent components for the notifying node S 150 includes a link 160, a link 170, a link 180 and a link 190 because each of the links 160, 170, 180 and 190 is directly adjacent to the notifying node S 150.

In another embodiment, an adjacent component may be any node that is directly adjacent to the notifying node S 150. For example, a set of the adjacent components includes a node A 110, a node B 120, a node C 130 and a node D 140 because each of the nodes 110, 120, 130 and 140 is directly adjacent to the notifying node S 150.

For purposes of illustrating clear examples, a method of determining a network repair address is described for adjacent components comprising links 160, 170, 180 and 190. However, the method can determine a network repair address for nodes 110, 120, 130 and 140 instead.

In an embodiment, a notifying node S 150 attempts to determine a set of adjacent components in the form of links that are directly adjacent to the notifying node S 150. In the example depicted in FIG. 2, such a set may include links 160, 170, 180 and 190.

In an embodiment, upon determining a set of adjacent components, a notifying node S 150 determines a not-via address for each of the adjacent component in the set of the adjacent components. For example, notifying node S 150 may start by determining a not-via address for link 160, which connects node A 110 with notifying node S 150. For link 160, notifying node S 150 attempts to find a backup path that could be used to reroute data traffic from node A 110 to notifying node S 150 in the event that link 160 becomes unavailable.

In an embodiment, a notifying node S 150 determines a not-via address for a protected component in the event that the protected component is unavailable. For example, in the example of FIG. 2, a notifying node S 150 may determine that if protected link 160 becomes unavailable, then data traffic from node A 110 may be rerouted from node A 110 to node B 120 and then via link 170 to notifying node S 150. The link 170 spanning node B 120 and notifying node S 150, can carry data traffic from node A 110 to notifying node S 150 if protected link 160 ever becomes unavailable. When protected link 160 becomes unavailable, data traffic from node A 110 can be carried "not via" protected link 160, but via link 170.

In an embodiment, a not-via address is named after the link for which the not-via address is generated. For example, referring to FIG. 2, if a not-via link 170 protects link 160, and link 160 may be represented as a link "A-S," then the not-via address may be indicated as "$S_A$," i.e. "S not-via A."

In the event that a protected link 160 fails, data traffic that was supposed to be directed from a node A 110 to a notifying node S 150, where S 150 is either a next hop or a destination node, may be rerouted to a not-via address. For example, data traffic intended to notifying node S 150 from node A 110 may be rerouted via node B 120 and link 170 to notifying node S 150.

The process of determining not-via addresses is repeated for each link adjacent to a notifying node S 150, and until a not-via repair address is found for each of the links.

Repair paths may be computed using various algorithms such as Shortest Path First ("SPF"). However, since each node in the network would be required to compute primary paths to other nodes and repair paths to the not-via addresses, the computational complexity of SPF may be problematic.

Various solutions have been proposed to reduce the computational overhead and to ensure that each node does not have to calculate an entire SPF for the failure of each other possible node. For example, if a node can determine that it will not be included in a repair path computed by another node to a repair address, then the node does not need to calculate its next hop for that repair address. The packets tunneled to a repair address will only originate from the repairing nodes located around a failed component—on the other side of the failed component from the repair address.

In an embodiment, an incremental SPF algorithm can be implemented to compute repair paths. Performing the incremental SPF algorithm is significantly less expensive than performing the full SPF. In a network with "N" nodes, each node has to calculate a repair path for "N-1" failures; however, the computational effort associated with performing the incremental SPF is less significant than performing "N-1" full SPF computations.

The process of storing the not-via addresses in association with the respective protected links is performed by each node in the network that received the respective advertisement. Thus, once each of the advertisements is processed by each node, each node has already computed a repair path to each of the not-via addresses. Hence, the repair paths to the not-via addresses are available even before any of the protected component has actually failed.

If a protected link 160 indeed fails, then data packets intended to be forwarded via a notifying node S 150 are encapsulated using a not-via address and are directed to the not-via address to bypass the failed link 160. Because each node in the network has already computed a repair path to the not-via address that is associated with the link 160, and the computed repair path avoids the link 160, when the link 160 indeed fails, each node can immediately reroute the packets, which otherwise would have been transmitted via the failed link 160, via the repair path that bypasses the failed link 160.

The approach depicted in FIG. 2 assumes that a separate not-via address is obtained for each protected component adjacent to the notifying node. For example, the notifying node S 150 obtains a unique not-via address for each of the links 160, 170, 180, 190, and each of the unique not-via addresses is associated with only one link from the set of links 160, 170, 180, 190. Consequently, if a network has "L" links, then "2*L" not-via addresses are used to protect every link in the network with a unique not-via address. Also, if a node has "K" links, then the node needs to obtain "K" not-via addresses to protect each of its "K" links.

The approach depicted in FIG. 3 minimizes the number of the not-via addresses while still providing the not-via capability to the nodes. Frequently, the not-via paths computed for the adjacent components of a node have a common ingress node.

Definitions of an ingress node depend on the context in which the ingress node appears. However, for purposes of explaining the not-via approach herein, in the context of determining repair paths, an ingress node with respect to the notifying node S 150, depicted in FIG. 2 and FIG. 3, is any node adjacent to the notifying node S 150 through which data traffic may be directed to the notifying node S 150.

In an embodiment, the ingress points may be determined by running a reverse Shortest Path First (rSPF) algorithm with each link disabled in turn.

As it will be described below, very often a particular network repair address (not-via address) may be used when not just one particular protected component fails, but when any of several protected components fails. Thus, one network repair address (not-via address) may be associated with a set of protected components, not just one protected component.

FIG. 3 illustrates determining a network repair address for a protected component. In an embodiment, a notifying node S 150 determines a not-via address for one adjacent link at a time. For example, notifying node S 150 may start determining a not-via address for link 160. The link 160 is referred to as a protected link. The not-via address may be determined in the manner described for FIG. 2.

As depicted in FIG. 3, for link 160, notifying node S 150 may find a path that includes link 165, node B 120 and link 170. If link 160 becomes unavailable, data traffic from node A 110 to notifying node S 150 may be rerouted via links 165, 170. In this example, link 170 is protecting link 160.

The process is repeated for each link adjacent to a notifying node. For example, as depicted in FIG. 3, for link 180, notifying node S 150 may find a path that includes link 185, node B 120 and link 170. In the event that link 180 becomes unavailable, data traffic from node C 130 to notifying node S 150 may be rerouted via links 185, 170. In this example, link 170 is protecting link 180.

In FIG. 3, a notifying node 150 has determined that link 170 protects at least two links 160, 180. For example, as notifying node S 150 repeats the process of determining a not-via addresses for each of the links adjacent to notifying node S 150, notifying node S 150 may determine that the same not-via address may be used to protect even more links than links 160, 180.

If a notifying node S 150 can determine that at least two links are protected by the same not-via address, then notifying node S 150 does not have to determine a unique not-via address for each of the protected components. Instead, the notifying node S 150 may determine a single not-via address for a particular not-via component and associate that single not-via address with each of the protected links. For example, in FIG. 3, since link 170 protects at least link 160 (link A-S) and link 180 (link C-S), notifying node S 150 may find just one, single not-via address for link 170, and associate the not-via address with a set of protected links 160, 180. The not-via address associated with link 170 (link B-S) may be denoted as $S_A\&_C$ because it may be used to protect both links A-S and C-S.

Similarly, if a notifying node S 150 determines that a link 180 is a not-via address that protects at least link 170 (link B-S) and link 190 (link D-S), then notifying node S 150 may find just one, single not-via address for link 180, and associate the not-via address with a set of protected links 170, 190. The not-via address associated with link 180 (link C-S) may be denoted as $S_{B\&D}$ because it may be used to protect both links B-S and D-S.

In an embodiment, the number of not-via addresses required to protect the links adjacent to a notifying node S 150 may be significantly reduced because one not-via address may be used to protect two or more adjacent links.

A reduction of the number of not-via addresses for adjacent links of the notifying node also reduces the computations involved in computing repair paths for the protected components. If a single not-via address is used to protect only link, then to compute a repair path, a notifying node disables all links one at a time and performs a truncated incremental SPF to do the calculations. However, if a single not-via address is used to protect two or more links, then fewer not-via calculations are needed.

In some cases multiple links need to be disabled in each of the calculations. For example, if a single not-via address $S_{A\&C}$ is used to protect two links 160 and 180, then computing a repair path for each link 160 and 180 requires disabling both links 160 (link A-S) and 180 (link C-S). Similarly, if a single not-via address $S_{B\&D}$ is used to protect two links 170 and 190, then computing a repair path for each link 170 and 190 requires disabling both links 170 (link B-S) and 190 (link D-S).

4.0 Example Advertisement Comprising a Network Repair Address

In an embodiment, not-via addresses are advertised to the nodes in the network. For example, if a notifying node determined two not-via addresses, and each of the not-via addresses has an associated set of protected links, then the notifying node sends each of the not-via addresses along with the associated set of the respective protected components to other nodes. Upon receiving not-via advertisements, a router computes respective repair paths using the not-via addresses and stores the repair paths in a database.

FIG. 4 illustrates a schematic representation of information carried in a not-via address advertisement. The not-via address advertisement may be structured in a variety of ways. The example depicted in FIG. 4 is just one of the methods for organizing the advertisement information included in a not-via advertisement.

In an embodiment, advertisement information may be encapsulated in an IS-IS LSPs, a Link State Advertisement ("LSA") packet, or any other message that complies with the protocol implemented by the nodes.

FIG. 4 depicts examples of two advertisements in rows 450, 460 respectively. Two advertisements are shown for purposes of illustrating clear examples; practical embodiments may include data structures that store information about any number of advertisements and that store more information that it is depicted in FIG. 4. The examples are provided solely to illustrate one of many possible structures that can be used to store information about repair addresses. In each of the examples, some, but not all, pieces of the advertised information are illustrated. In practical implementations, a repair address advertisement may contain other information and the information may be stored in different data structures.

In an embodiment, an advertisement is a not-via address advertisement. A particular not-via address advertisement may comprise data representing a not-via repair address 410 and a set of protected links 430. The not-via address 410 is a repair address that can be used when any of the protected links in the set of the protected links 430 fails.

A first advertisement depicted in row 450 comprises a not-via repair address $S_{A\&C}$. The not-via repair address $S_{A\&C}$ may be used when any of the {A-S, C-S} links fails. Referring to FIG. 3, if either a link A-S (link 160) or a link C-S (link 180) (or both) fails, then data traffic intended to a notifying node S 150 may be directed around the respective failed link to the not-via repair address $S_{A\&C}$.

A second advertisement depicted in row 460 comprises a not-via repair address $S_{B}\&_{D}$ that may be used when any of the {B-S, D-S} links fails. Referring now to FIG. 3, if either link B-S (link 170) or link D-S (link 190) (or both) fails, then data traffic intended to node S 150 may be directed around the respective failed link to the not-via repair address $S_{B\&D}$.

5.0 Determining a Single Network Repair Address for a Set of Components

In an embodiment, each node in a network may be a notifying node S (depicted in FIG. 3 as element 150) and may execute an algorithm to determine network repair addresses for its adjacent links or its adjacent nodes. For purposes of illustrating clear examples, the description below pertains to determining repair addresses for the links that are adjacent to the notifying node. However, embodiments also may be used for determining repair addresses for adjacent nodes.

In an embodiment, a notifying node may determine that each of the protected links (or protected nodes) that are adjacent to the notifying node requires a separate unique not-via address. For example, if a notifying node has "L" protected links and each link has an associated unique not-via address, then the notifying node has to advertise "L" not-via addresses or one not-via address for each protected link. For example, in a network with 70 nodes and 165 protected links, the total number of 330 addresses is advertised among the 70 nodes.

The optimization method presented above allows assigning a single not-via address to a set of protected links. Therefore, in the optimization method, the amount of not-via advertisements sent by the notifying node can be significantly reduced.

In an embodiment, a notifying node may determine that a single not-via address can be used by two or more protected links (or protected nodes) that are adjacent to the notifying node. For example when the optimization method was tested on a network with 70 nodes and 165 protected links, it was found that the notifying nodes needed to advertise only 144 not-via addresses, some of which were used to protect multiple links.

In one of the tested networks, one of the notifying nodes had 34 protected links. With the optimization method, according to the collected statistical data, instead of determining 34 unique not-via address, the number of not-via addresses that needed to be advertised by that notifying node was 3. The average number of the not-via addresses that needed to be advertised per node was 2.1.

In FIG. 3, a notifying node S 150 has four adjacent links 160, 170, 180, 190. In an embodiment, notifying node S 150 determines that a particular not-via address can be used to forward data traffic to notifying node S 150 when any of several other adjacent links fails.

Benefits of determining a single not-via address for a set of adjacent links include reducing the number of not-via addresses that each notifying node needs to determine for its adjacent components, and reducing the number of not-via address advertisements that each notifying node needs to disseminate to other nodes.

Figure 5:
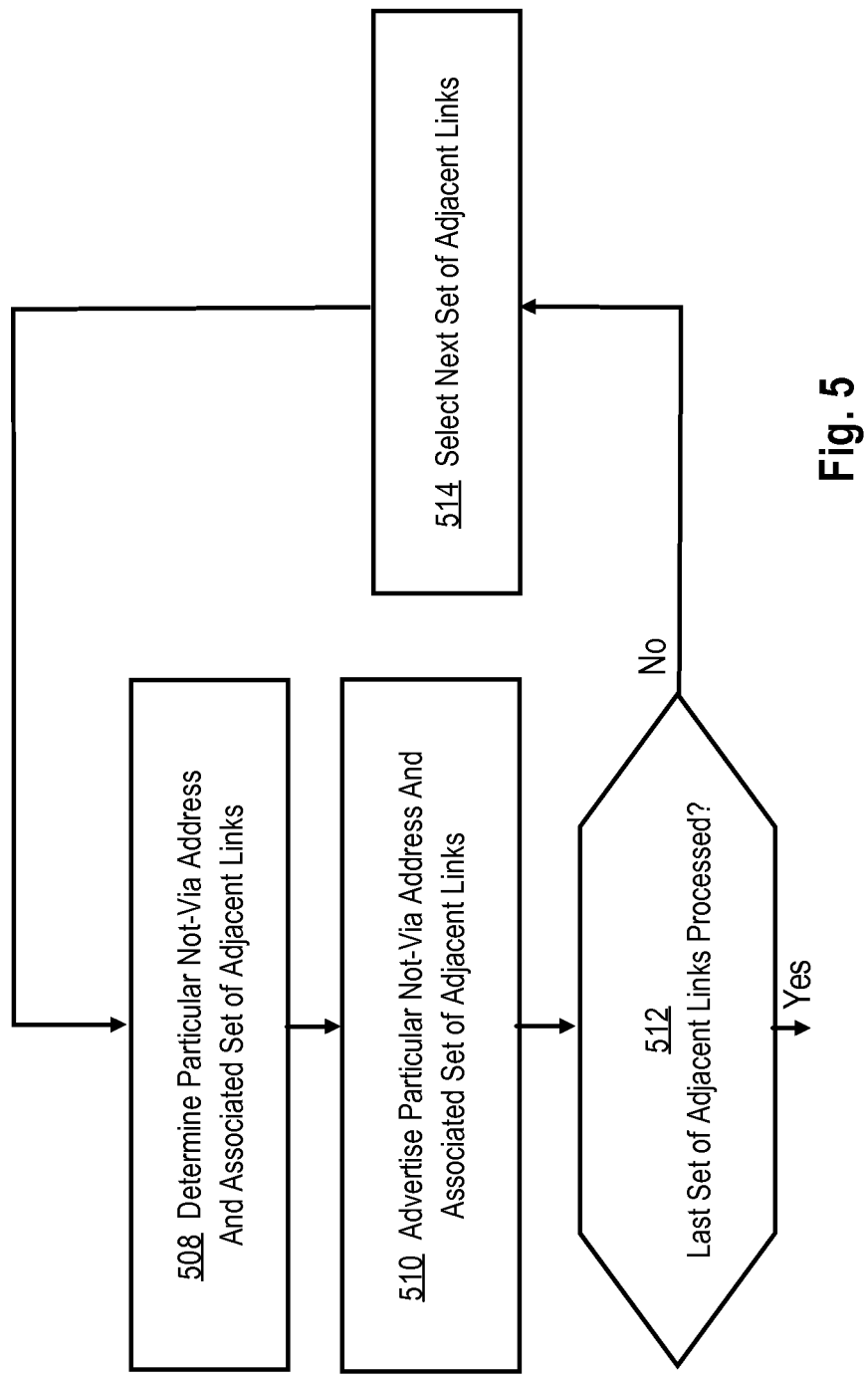
FIG. 5 illustrates an embodiment of determining a single network repair address for a set of components.

FIG. 5 illustrates an embodiment of determining a single network repair address for a set of adjacent links. A node that constructs a repair path for its adjacent links is referred to as a notifying node and a link for which a repair path is determined is referred to as a protected link.

In an embodiment, a notifying node identifies a set of adjacent links that are adjacent to the notifying node and through which the notifying node is reachable. This may involve determining ingress nodes for the notifying node. An ingress node may be determined by running a reverse SPF rooted at the notifying node with each link in turn disabled and determining the node (or nodes) through with the notifying node is reachable.

In an embodiment, the ingress points may be determined by running a reverse Shortest Path First (rSPF) algorithm with each link disabled in turn.

For each of the adjacent links, the notifying node determines a not-via address, as described above. For example, referring again to FIG. 3, a notifying node S 150 may determine that, in the event of unavailability of a link 160, data traffic from a node A 110 that is destined to notifying node S 150 may be redirected via a link 170. Furthermore, the notifying node S 150 may determine that, in the event of unavailability of a link 180, the traffic from a node C 130 may be also redirected via link 170.

In an embodiment, a notifying node S 150 stores information about associated protected node(s) and constructs a histogram of the frequencies for each of the ingress nodes. Based on a frequency histogram, an ingress node that is the most frequently occurring as an ingress node is selected. If two or more ingress nodes occur as ingress nodes with the same frequency, then one of such ingress nodes is arbitrarily selected as the particular not-via component.

In an embodiment, a frequency histogram includes bindings between ingress nodes and respective protected links. For example, for each ingress node included in the histogram, the histogram includes a binding comprising the links that the ingress node protects. The bindings included in the histogram are useful in determining the protected links when the most frequently occurring ingress node in the histogram is chosen. For instance, upon selecting the most frequently occurring ingress node in the histogram, the bindings for the selected ingress node are retrieved and based on the bindings, the protected links are determined. In an embodiment, selecting the most frequently occurring ingress node in a histogram is performed as an iterative process. For example, upon selecting the most frequently occurring ingress node, bindings for the selected ingress node are retrieved to identify the links that the selected ingress node protects, and one not-via address is determined for a set of the identified protected links. Subsequently, the selected most frequently occurring ingress node is removed from the histogram, and a "second" most frequently occurring ingress node is selected based on remaining information stored in the histogram.

In step 508, a notifying node determines a not-via address for a set of adjacent links. A not-via address is a network repair address that may be used by other nodes to forward data packets. For example, in FIG. 3, if a link 170 protects two links 160, 180, then a not-via address for links 160, 180 may be indicated as "$S_{A\&C}$."

In FIG. 5, in step 510, a notifying node advertises a particular not-via address and a set of adjacent links that are associated with the particular not-via address. As seen in FIG. 3, notifying node S 150 may advertise $S_{A\&C}$ as a not-via address that can be used to protect each of the links 160 and 180. Example not-via address advertisement is depicted in FIG. 4. For instance, an advertisement 450 in FIG. 4 may comprise a not-via address $S_{A\&C}$ and a set of the adjacent links {A-S, C-S}, for which the not-via address $S_{A\&C}$ may be used in the event that any of the links A-S or C-S (or both) becomes unavailable.

In FIG. 5, in step 512, a notifying node determines whether a last set of adjacent links has been processed. If the last set of adjacent links has not been processed, then in step 514, the notifying node selects a next set of adjacent links, and proceeds to determining a particular not-via address for the set of adjacent links in step 508, described above. The selection of the set of adjacent links is performed by choosing the highest frequency occurring ingress node corresponding to the links which have not yet been processed. If the last set of adjacent links has been processed, the process of determining not-via addresses for the protected components is complete.

6.0 Using a Single Network Repair Address Upon Unavailability of a Component

Upon receiving a not-via advertisement, a node stores the information included in the advertisement. As depicted in FIG. 4, in an advertisement 450, a not-via address 410 is a repair address that will be used when any of the protected components in the set 430 fails.

A node that received one or more not-via advertisements from a notifying node constructs respective forwarding tables that comprise the not-via addresses included in the not-via advertisements. In an embodiment, all participating nodes compute their next hops not only for each normal (non-failed) address but also for each not-via address associated with a protected link. As a result, each node constructs a repair path to each notifying node avoiding the protected link, and stores a next hop on the repair path along with the corresponding not-via address.

In an embodiment, the router maintains forwarding tables along with the corresponding not-via addresses that are available in the event that any of the protected component of a notifying node fails or otherwise becomes non-available. If a protected component of the notifying node becomes unavailable, then the router may use the not-via address as a repair address and forward the data packets to the notifying node using the respective not-via address as the repair address.

In FIG. 4, an advertisement in a row 450 comprises a not-via repair address $S_{A\&C}$. The not-via repair address $S_{A\&C}$ will be used when any of the {A-S, C-S} links fails. Thus, if either the link A-S or the link C-S fails, then the router may direct the data traffic intended to a notifying node to the not-via repair address $S_{A\&C}$.

7.0 Implementation Mechanisms—Hardware Overview

Figure 6:
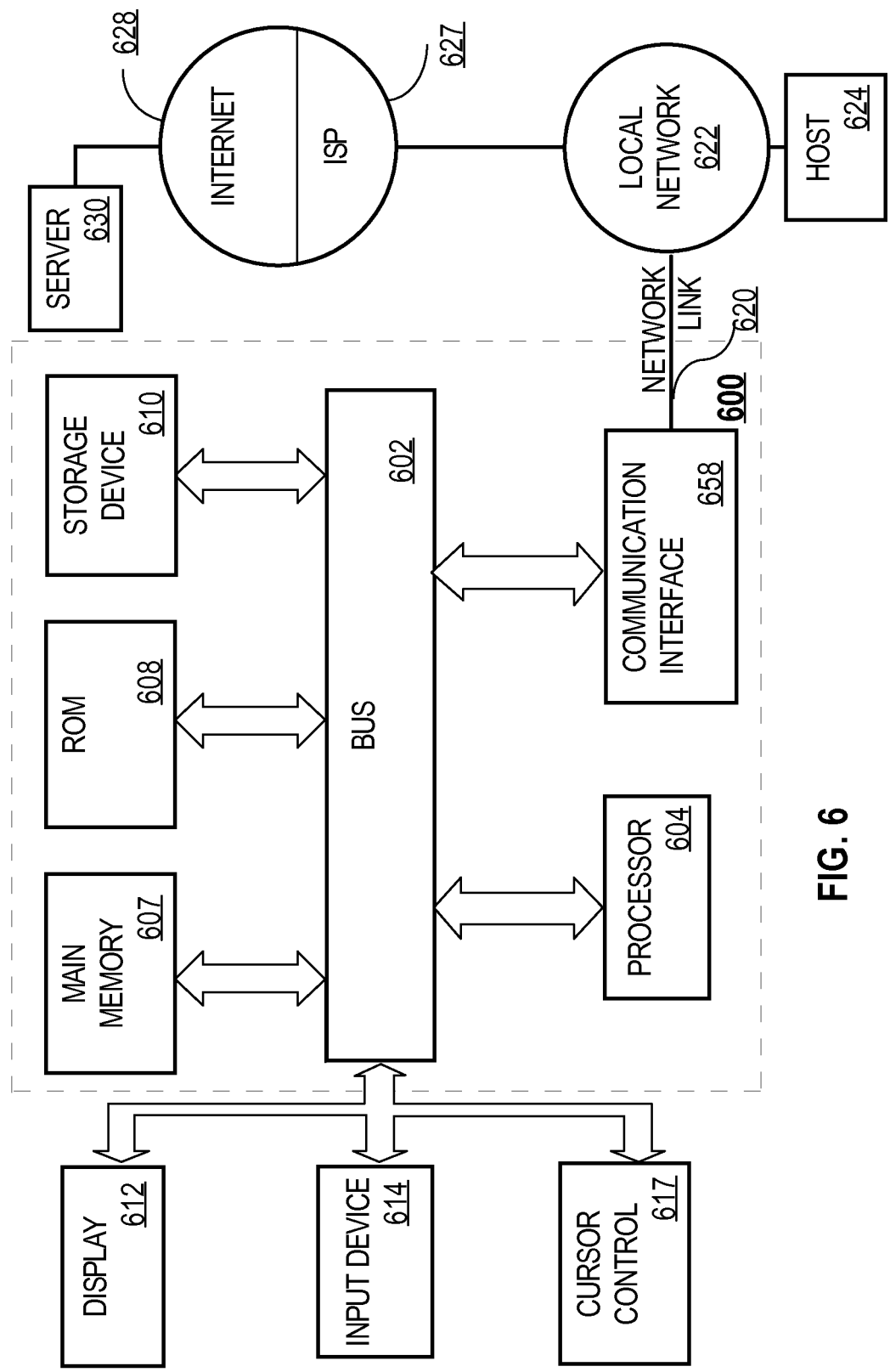
FIG. 6 illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 618.

Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

According to one embodiment, compliance management is provided by computer system 600 in response to processor 604 executing one or more sequences of one or more instructions contained in main memory 606. Such instructions may be read into main memory 606 from another computer-readable storage medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 604 for execution. Such a medium may take many forms, including but not limited to, non-transitory and non-volatile storage media and non-transitory volatile storage media. Non-volatile storage media includes, for example, optical or magnetic disks, such as storage device 610. Volatile storage media includes dynamic memory, such as main memory 606.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions.

The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for compliance management as described herein. The received code may be executed by processor 604 as it is received, and/or stored in storage device 610, or other non-volatile storage for later execution.

8.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
   determining two or more protected components that are associated with a notifying node;
   prior to determining that any of the two or more protected components is unavailable, determining a single network repair address for the two or more protected components, wherein the single network repair address is to be used in an event of unavailability of any of the two or more protected components when transmitting network traffic to the notifying node;
   assigning the single network repair address to the two or more protected components;
   wherein the notifying node is an internetworking device and wherein the method is performed by one or more processors of the notifying node.

2. The method of claim 1, further comprising advertising the single network repair address and the two or more protected components that are associated with the single network repair address.

3. The method of claim 1, wherein the two or more protected components comprise two or more links that are adjacent to the notifying node.

4. The method of claim 1, wherein the two or more protected components comprise two or more nodes that are adjacent to the notifying node.

5. The method of claim 1, further comprising:
constructing a repair network topology that does not include a particular protected component and identifying a repair path around the particular protected component to the notifying node that does not include the particular protected component;
wherein the repair topology excludes network components that do not have a repair address capability;
transmitting network traffic to the notifying node using the single network repair address in response to detecting that the particular protected component, from the two or more protected components, is unavailable.

6. A non-transitory computer-readable medium storing one or more sequences of instructions which, when executed by one or more processors, cause the one or more processors to perform:
determining two or more protected components that are associated with a notifying node;
prior to determining that any of the two or more protected components is unavailable, determining a single network repair address for the two or more protected components, wherein the network repair address is to be used in an event of unavailability of any of the two or more protected components when transmitting network traffic to the notifying node;
assigning the single network repair address to the two or more protected components;
wherein the notifying node is an internetworking device.

7. The non-transitory computer-readable medium of claim 6, further comprising instructions which, when executed, cause the one or more processors to perform advertising the single network repair address and the two or more protected components that is associated with the single network repair address.

8. The non-transitory computer-readable medium of claim 6, wherein the two or more protected components comprise two or more links that are adjacent to the notifying node.

9. The non-transitory computer-readable medium of claim 6, wherein the two or more protected components comprise two or more nodes that are adjacent to the notifying node.

10. The non-transitory computer-readable medium of claim 6, further comprising instructions which, when executed, cause the one or more processors to perform:
constructing a repair network topology that does not include a particular protected component and identifying a repair path around the particular protected component to the notifying node that does not include the particular protected component;
wherein the repair topology excludes network components that do not have a repair address capability;
transmitting network traffic to the notifying node using the single network repair address in response to detecting that the particular protected component, from the two or more protected components, is unavailable.

11. A data processing method comprising:
in an internetworking router or switch configured as a notifying node and comprising one or more processors coupled to a routing database of stored data representing nodes and links of a packet data network:
determining two or more protected components that are associated with the notifying node;
prior to determining that any of the two or more protected components is unavailable, determining a single network repair address for the two or more protected components, wherein the single network repair address is to be used in an event of unavailability of any of the two or more protected components when transmitting network traffic to the notifying node;
assigning the single network repair address to the protected components.

12. The method of claim 11, further comprising advertising the single network repair address and the two or more protected components.

13. The method of claim 11, further comprising:
constructing a repair network topology that does not include a particular protected component and identifying a repair path around the particular protected component to the notifying node that does not include the particular protected component; wherein the repair topology excludes network components that do not have a repair address capability;
transmitting network traffic to the notifying node using the single network repair address in response to detecting that the particular protected component, from the two or more protected components, is unavailable.

14. The method of claim 11, wherein the two or more protected components comprise two or more links that are adjacent to the notifying node.

15. The method of claim 11, wherein the two or more protected components comprise two or more nodes that are adjacent to the notifying node.

* * * * *